(12) United States Patent
Takeuchi

(10) Patent No.: US 9,108,744 B2
(45) Date of Patent: Aug. 18, 2015

(54) AIRPORT CONSTRUCTION

(76) Inventor: Arthur S. Takeuchi, Chicago, IL (US)

( * ) Notice: Subject to any disclaimer, the term of this patent is extended or adjusted under 35 U.S.C. 154(b) by 2297 days.

(21) Appl. No.: 11/890,670

(22) Filed: Aug. 7, 2007

(65) Prior Publication Data

US 2008/0035791 A1 Feb. 14, 2008

Related U.S. Application Data

(60) Provisional application No. 60/836,303, filed on Aug. 8, 2006.

(51) Int. Cl.
*B64F 1/00* (2006.01)
*B64F 1/36* (2006.01)
*B64F 1/305* (2006.01)

(52) U.S. Cl.
CPC . *B64F 1/00* (2013.01); *B64F 1/305* (2013.01); *B64F 1/36* (2013.01)

(58) Field of Classification Search
USPC .......... 52/174, 175, 169.2–169.4; 244/114 R; 114/258; 405/229
See application file for complete search history.

(56) References Cited

U.S. PATENT DOCUMENTS

| | | | | | |
|---|---|---|---|---|---|
| 1,997,945 | A | * | 4/1935 | Olaszy | 244/63 |
| 2,400,841 | A | * | 5/1946 | Rogers | 244/114 R |
| 3,554,470 | A | * | 1/1971 | Dudley | 244/114 R |
| 3,556,441 | A | * | 1/1971 | Oberlander | 244/114 R |
| 3,571,990 | A | * | 3/1971 | Rossman | 52/30 |
| 3,724,015 | A | * | 4/1973 | Japes | 104/71 |
| 3,842,553 | A | * | 10/1974 | Billgren et al. | 52/175 |
| 3,916,588 | A | * | 11/1975 | Magill | 52/30 |
| 3,981,464 | A | * | 9/1976 | Dudley | 244/114 R |
| 4,416,435 | A | * | 11/1983 | Szendrodi et al. | 244/114 R |
| 5,842,667 | A | * | 12/1998 | Jones | 244/114 R |
| 6,279,855 | B1 | * | 8/2001 | Domer | 244/114 R |
| 6,481,039 | B1 | * | 11/2002 | Rolfe et al. | 14/72.5 |
| 6,496,996 | B1 | * | 12/2002 | Worpenberg et al. | 14/71.5 |
| 7,275,715 | B2 | * | 10/2007 | McCoskey et al. | 244/118.1 |

* cited by examiner

*Primary Examiner* — Joseph W Sanderson
(74) *Attorney, Agent, or Firm* — Van Metre Lund

(57) ABSTRACT

A major portion, if not the whole, of passenger facilities are located underground to reserve a virtually building-free ground level for the most efficient movements of aircraft. A number of pairs of parked positions of aircraft for loading/unloading are arranged in each of a number of rows. Adjacent aircraft face in opposite directions to facilitate loading/unloading from and to a pair of passenger gates located below each pair of such parked positions and to also facilitate forward movement of aircraft to and from such parked positions. The resulting arrangement is compact and allows efficient movement of aircraft to and from runways while also minimizing the distances passengers travel in moving from a terminal to gates and in moving from one gate to another. Loading/unloading ramps are moveable between inactive positions out of the paths of aircraft and active positions for loading and unloading. Two such ramps can be provided for fore and aft loading of one aircraft.

15 Claims, 5 Drawing Sheets

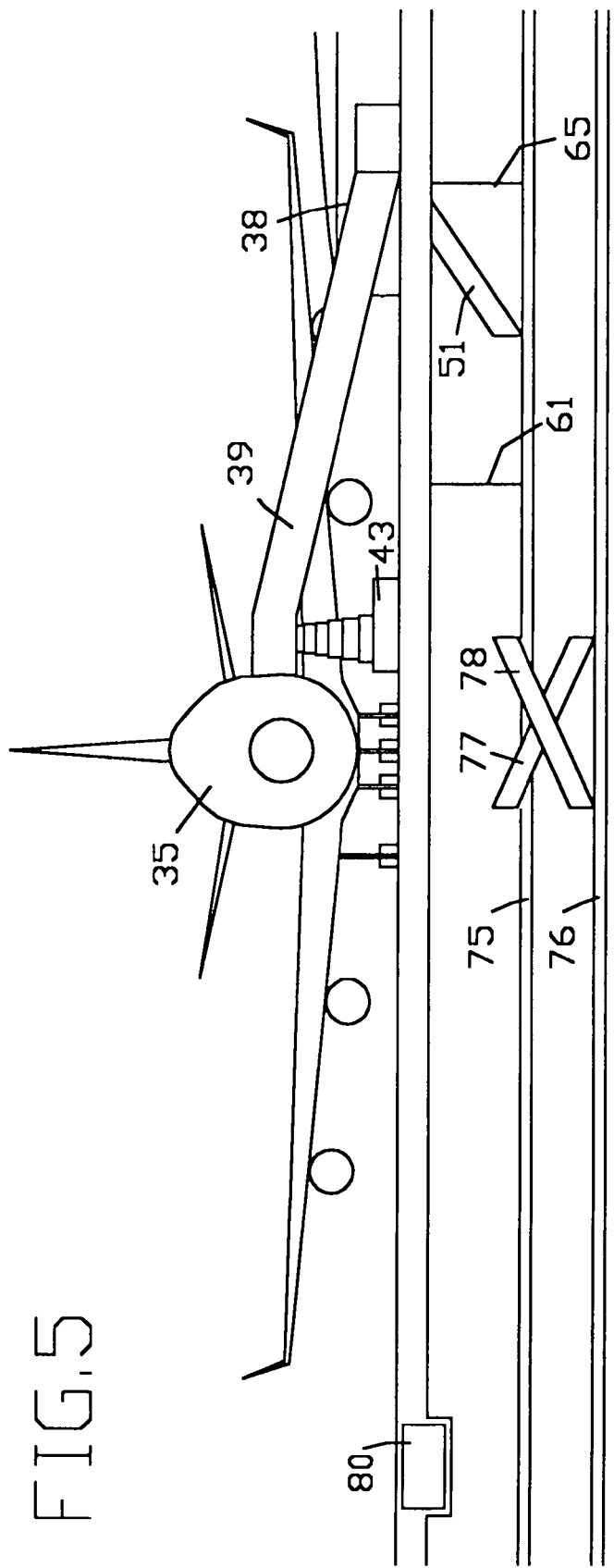

AIRPORT CONSTRUCTION

CROSS-REFERENCE TO RELATED APPLICATIONS

Applicant claims the priority of U.S. Provisional Application No. 60/836,303, filed on Aug. 8, 2006.

The invention disclosed herein is not the result of any federally sponsored research or development activities.

BACKGROUND OF THE INVENTION

The construction of airports is well known. Many improvements have been made or proposed but the basic construction has remained the same.

SUMMARY OF THE INVENTION

This invention was evolved with the general object of improving the construction of airports. Important aspects of the invention relate to the concept of placing passenger facilities underground, below the level of the surface on which aircraft are supported, and to the recognition of important advantages which result, especially when all or a major portion of the passenger facilities are underground.

An important feature of the invention is that a ground level can be reserved that can be substantially building-free with most passenger facilities being located underground. As shown herein, terminal facilities and driveways for access thereto, as well as parking areas, may be located at ground level but in accordance with the invention, terminal facilities and driveways as well as light rail or other transport means, also parking areas, may be located underground. In any case, passengers need to move through only relatively short distances between a terminals and gates and other passenger facilities.

Another important feature is that a ground level is made available for the most efficient movement of aircraft. Parked positions at which aircraft are loaded or unloaded can be so located as to facilitate movement to and from runways. A large number of parked positions can be arranged in a small compact area. The parked positions can be located in rows with aisles there-between for movement of aircraft to and from runways. As shown herein, the rows and aisles may be in straight lines but they may extend arcuately about a common center and with different radii, forming complete concentric circles if desired. In either case, parked positions can be so located as to allow aircraft to moved in a forward direction into a parked position and, after loading or unloading, to be again moved in a forward direction out of the parked position, obviating the need for the backward movements of aircraft required by conventional airports. Similar features can also be used for locating positions at which aircraft are located for servicing using one or more separate portions of the same lower level used for passenger facilities.

A further very important feature is that it is possible to safely and efficiently load and unload aircraft, especially large aircraft, at entrances which are both fore and aft. A pair of ramps can be used that in active conditions extend in generally parallel relation to each other and a wing of the aircraft and in generally transverse relation to the fuselage of the aircraft. Such ramps can be pivoted or otherwise moved to inactive conditions in which they are out of the path of aircraft being moved to and from a parked position.

Additional important features of the invention relate to the location of passenger waiting areas or gates under parked positions of the aircraft for direct and convenient movement of passengers to or from the aircraft. When the parked positions of aircraft are arranged for efficient movement of aircraft as aforementioned and the gates are in underlying relation to the parked positions, the distances between a terminal and gates and between gates can be much shorter than the distances encountered in conventional airport constructions. The need for people-movers can be obviated in smaller airports. In larger airports, people-movers can be used in a highly convenient and efficient manner to move people between a terminal or a parking area and rows of gates and along rows of gates. People-movers can be located in a separate underground level which can be below that used for gates.

Further important features of the invention relate to loading and unloading of baggage. Conveyors can be located in underground tunnels which can be at a level below that used for gates and which can move baggage horizontally to and from positions below the parked positions of aircraft. Additional conveyors and/or elevators can be used in proximity to each parked position to move baggage between the horizontal conveyors and the aircraft. This feature obviates the need for and inherent dangers and costs of moving baggage on the ground level as employed in conventional airports.

Still further features of the invention relate to the locations of structures for using daylight to illuminate passenger waiting areas and other portions of the passenger level and to the provision of ramps, escalators and elevators used for moving passengers between gates and parked aircraft.

This invention contemplates other objects, features and advantages which will become more fully apparent from the following detailed description taken in conjunction with the drawings.

BRIEF DESCRIPTION OF THE DRAWING FIGURES

FIG. 5 is a sectional view taken substantially along line 5-5 of FIG. 3.

DESCRIPTION OF PREFERRED EMBODIMENTS

Figure 1:
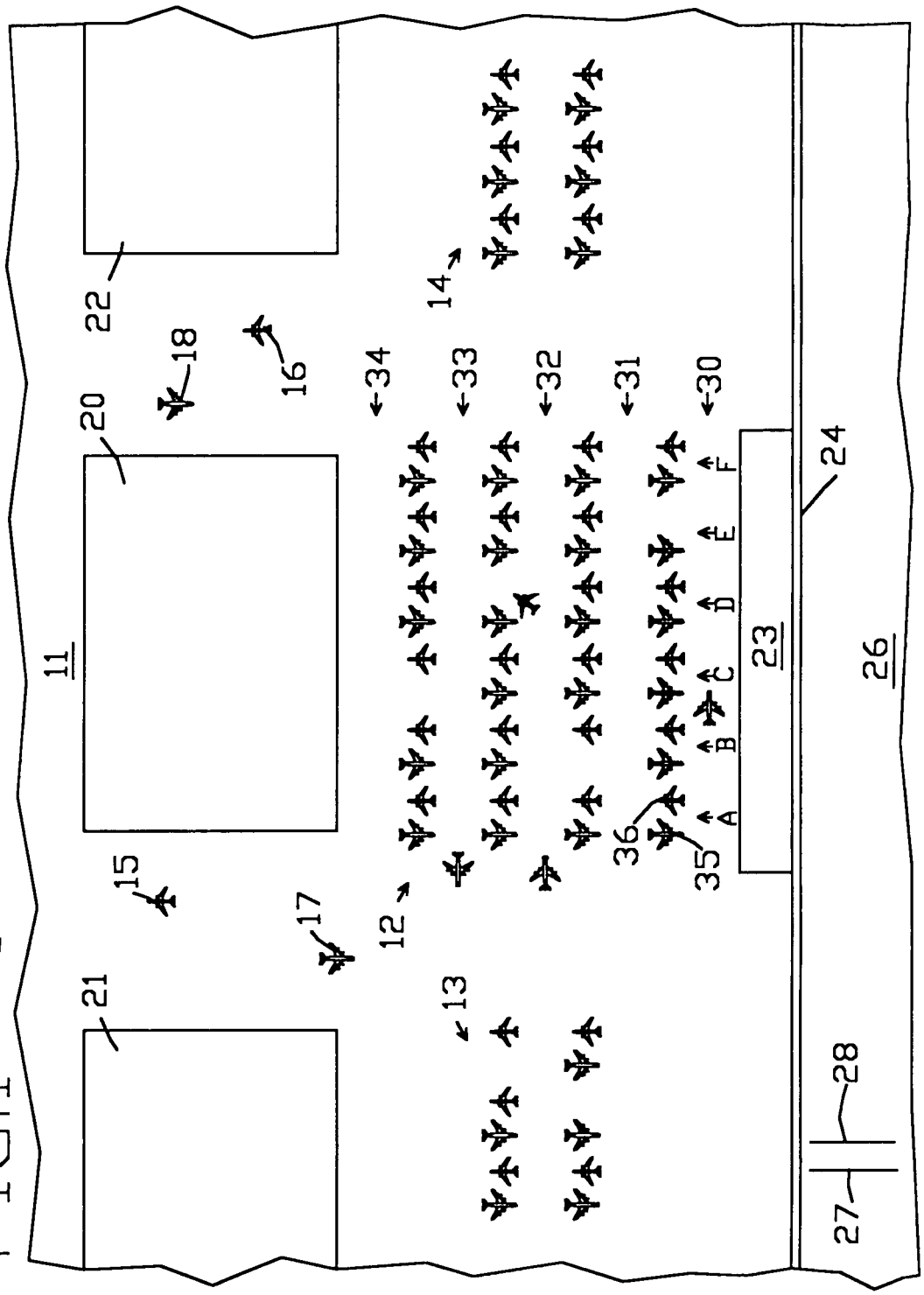
FIG. 1 is a diagrammatic top plan view of a portion of an airport constructed in accordance with the principles of this invention, showing aircraft in loading/unloading positions and in positions during movements to and from such loading/unloading positions.

In FIG. 1, reference numeral 10 generally designates an airport constructed in accordance with the invention. The airport 10 includes an apron portion 11 having an upper surface at ground level that supports aircraft for movement to and from runways and that supports aircraft at positions in a passenger loading/unloading area generally indicated by reference numeral 12 and in servicing areas generally indicated by reference numerals 13 and 14. Passenger facilities are positioned underground below the apron 11 and the loading/unloading area 12 as hereinafter described. Aircraft 15 and 16 are depicted as moving toward runways and while aircraft 17 and 18 are depicted as moving from runways toward the loading/unloading area 12 or servicing areas 13 and 14. Rectangles 20, 21 and 22 diagrammatically indicate expansion areas which may be incorporated in airport plans for expansion of the areas 12, 13 and 14, each of the expansion areas 20-22 being usable to provide additional passenger loading/unloading or aircraft servicing positions.

A terminal 23 is provided adjacent one side of the loading/unloading area 12 and along a driveway 24 for vehicular traffic. Passengers entering the terminal 23 at ground level may move through escalators, elevators or stairs to an underground passenger concourse that includes a portion providing gates that underlie aircraft in positions in loading/unloading area 12. The arrangement results in very short distances between many gates and the terminal 23. A parking region 26 may be provided along the driveway and may have a number of levels. Access from the parking region to the underground passenger concourse and to people movers may be provided as diagrammatically indicated by broken lines 27 and 28. Although shown at ground level, the terminal 23, driveway 24 and parking regions may be located underground at the same level as the passenger concourse.

As shown in FIG. 1, the aircraft positions in the passenger loading/unloading area 12 are arranged in four rows with twelve positions in each row and with five aisles in which aircraft may move. A first aisle 30 is provided between the terminal 23 and a first row that is closest to the terminal. A second aisle 31 is provided between the first row and a second of the four rows. A third aisle 32 is provided between the second row and a third of the four rows. A fourth aisle 33 is provided between the third row and the fourth of the four rows. A fifth aisle 34 is provide between the fourth row and the illustrated expansion area 20. The twelve aircraft positions in each row are arranged in six pairs. In each pair of aircraft positions the aircrafts face in opposite directions. Thus, as shown, aircrafts 35 and 36 in the left-most pair of the first row face in opposite directions, aircraft 35 facing toward the terminal 23 and aircraft 36 facing away from the terminal. The aircraft 35 may have been moved in a forward direction from aisle 31 to reach the position shown and, after loading or unloading, may again move in a forward direction and into the aisle 30. Similarly, the aircraft 36 may have been moved in a forward direction from aisle 30 to reach the position shown and, after loading or unloading, may again move in a forward direction and into the aisle 31. To facilitate movements, each aisle is preferably used for movement in only one direction. Thus aisles 30, 32 and 34 may only be used for movements to the right as illustrated while aisles 31 and 33 may only be used for movement to the left as illustrated. As has been noted, rows and aisles, although being shown as extending in straight lines, may extend arcuately about a common center and with different radii, forming complete concentric circles if desired. In that case, the parked positions of aircraft can be such that aircraft are moved only in a forward direction, but it may be desirable to allow bi-directional movement of aircraft in certain aisles, especially aisles between outer rings of parked positions.

In the underground passenger concourse, a pair of gates are associated with each pair aircraft positions and six corridors extend away from the terminal 23 for access to such pairs of gates. For the purpose of identification of gates and their locations, such six underground corridors may be identified by reference characters A, B, C, D, E and F and positioned as shown in FIG. 1. With four rows of aircraft positions as shown in FIG. 1, eight gates are accessible from each corridor. The eight gates associated with each corridor may be identified by numerals 1 through 8 with an odd number indicating a gate on the left and a even number indicating a gate on the right, Thus the gate associated with the position of aircraft 35 may be identified as gate A1 while the gate associated with the position of aircraft 36 may be identified as gate A2. The gate associated with the right-most aircraft position farthest from the terminal may be identified as gate F8.

Figure 2:
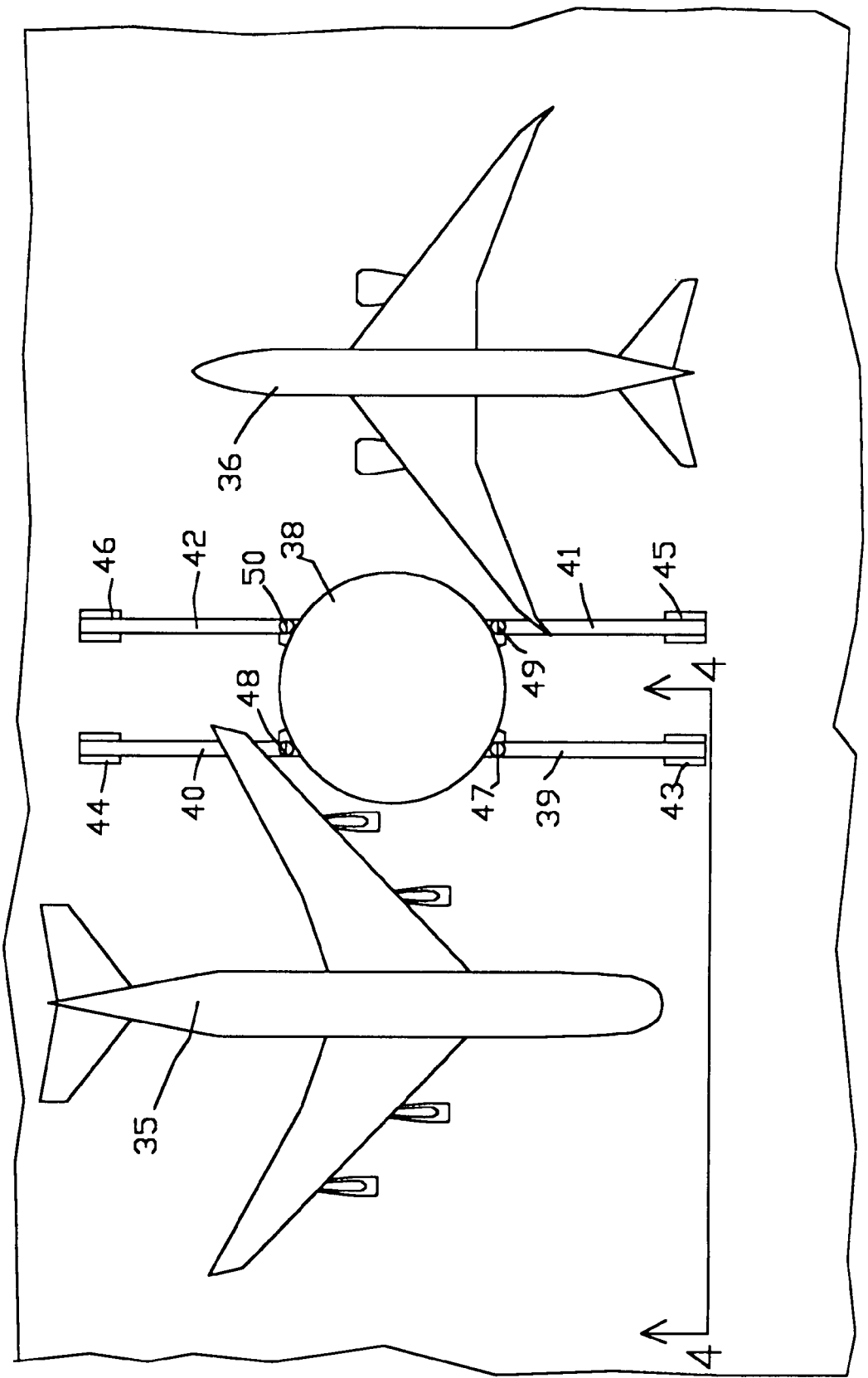
FIG. 2 is a top plan view corresponding to a portion of FIG. 1 but on a greatly enlarged scale, showing two aircraft in adjacent loading/unloading positions and showing structures not shown in FIG. 1 to avoid confusion, including an illumination dome structure and including ramp structures which are shown in inactive positions.
Figure 3:
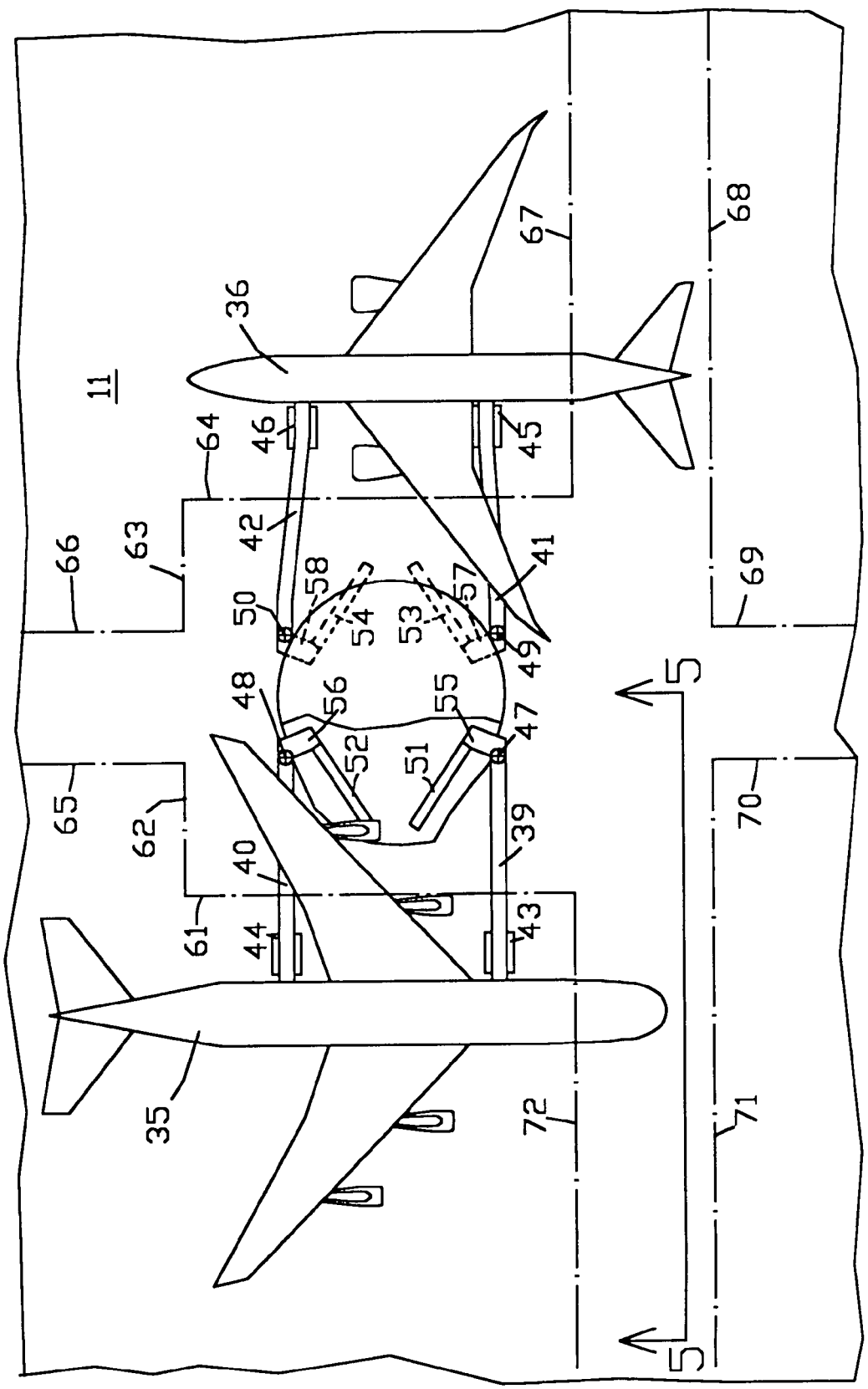
FIG. 3 is a view similar to FIG. 2 but showing ramp structures in active positions, showing in broken line the positions of walls of an underlying passenger level and also showing portions of the aircraft supporting surface and of the illumination dome structure broken away in order to show escalators extending up from an underlying passenger level.

FIG. 2 is a top plan view corresponding to a portion of FIG. 1 but on a greatly enlarged scale, showing the aircraft 35 and 36 in a pair of adjacent loading/unloading positions. FIG. 2 also shows structures that are not shown in FIG. 1 to avoid confusion, including an illumination dome structure 38 and including ramp structures 39, 40, 41 and 42 which are operated by actuators 43, 44, 45 and 46. The illumination dome structure 38 includes a frusto-spherical top wall of transparent or translucent material to use ambient light for illumination of underlying space during daylight hours. Ramp structures 39 and 40 are usable for fore and aft loading or unloading of aircraft in the position of aircraft 35 and ramp structures 41 and 42 are usable for fore and aft loading or unloading of aircraft in the position of aircraft 36. Such ramp structures are shown in FIG. 2 in inactive positions to be out of the way of aircraft such as aircrafts 35 and 36 when moved into and out of loading/unloading positions. FIG. 3 shows the ramp structures 39, 40, 41 and 42 after being moved by actuators 43, 44, 45 and 46 to active positions for loading or unloading of passengers. In doing so, the actuators 43, 44, 45 and 46 operate to pivot the structures about axes 47, 48, 49 and 50 and to lift the ends of the structures as required to place the ends of the structures opposite passenger-receiving openings in the fuselages of the aircraft. Then the actuators 43-46 operate to extend the lengths of the ramp structures 39-42 as required to place the ends of the ramp structures against the fuselages of the aircraft, the ramp structures 39-42 having telescopingly expandable portions for this purpose and to allow use with different types of aircraft. The angles of rotation from positions as shown in FIG. 2 to positions as shown in FIG. 3 vary with different types of aircraft but are approximately 90 degrees, the structures 39 and 42 being rotated in clockwise directions while structures 40 and 41 are rotated in counter-clockwise directions.

FIG. 3 also shows four escalators 51, 52, 53 and 54 usable to move passengers between a lower level and landings 55, 56, 57 and 58 which are adjacent to ends of the ramp structures 39, 40, 41 and 42 and which are approximately at ground level. A portion of the illumination dome 38 and a portion of the apron 11 are shown broken away to show escalators 51 and 52 and landings 55 and 56 in full lines while escalators 53 and 54 and landings 57 and 58 are shown in dotted lines. To enter the aircraft 35, a passenger may ride the escalator 51 to the landing 55 or ride the escalator 52 to the landing 56 and then use the ramp structure 39 or the ramp structure 40 to reach the aircraft. The ramp structures may be mechanized with a conveyor belt arrangement to provide a moving support that slowly carries a standing passenger, or a passenger on a wheel chair, up to the aircraft or down from the aircraft. Although not visible in the drawings, elevators are preferably provided for carrying handicapped persons or others to and from the landings 55-58.

As is apparent from the preceding description and from what is shown in the drawings, the apron 11 has openings therein for the purpose of operating during daylight hours to allow ambient light to illuminate underlying spaces, each opening being below a light-transmitting frusto-spherical top wall of a dome structure 38 and thereby being circular in form. Such circular openings in apron 11 are also used in the loading and unloading of passengers. In FIG. 3, portions of the top wall of the dome structure 38 and portions of the apron 11 are shown broken away to show the escalators 51 and 52 in full lines and to demonstrate that lower ends of all four escalators 51-54 on the underground level are outside the space below the circular opening in apron 11 and that the escalators extend upwardly from the underground level and through the circular opening to upper ends that are adjacent the landings 55-58. It will be understood that, as is conventional in airports, a loading or unloading operation is initiated and controlled by airport or airline personnel who, in the airport as disclosed, will be at an underground gate area where passengers are waiting. In a loading operation, passengers enter a lower end of one of the escalators 51-54 to move or be moved upwardly and through the circular opening in the apron 11, to then move from the upper end of the escalator and onto one of the landings 55-58 and to then move or be moved through one of the ramp structures 39-42 to the aircraft. To be direct, as previously described, such movements can be uninterrupted. To be convenient, as also previously described, uninterrupted movements can continue until a suitable completion of the loading operation with all passengers to be loaded being safely in the aircraft. In an unloading operation, an uninterrupted movement of passengers can be in an opposite direction and reverse order, from an aircraft to an underground gate area, and can continue until all passengers to be unloaded are safely in the underground gate area.

FIG. 3 also shows in broken lines the positions of walls of the lower passenger level. Walls 61, 62, 63 and 64 border a space under the illumination dome 38 that provides gate areas for loading/unloading of aircraft in the positions of aircrafts 35 and 36. A corridor bordered by walls 65 and 66, a second corridor bordered by walls 67 and 68, a third corridor bordered by walls 69 and 70 and a fourth corridor bordered by walls 71 and 72 extend in four directions from the space under the illumination dome 38. The corridor bordered by walls 65 and 66 and the corridor bordered by walls 69 and 70 form part of a corridor identifiable by reference character A as shown in FIG and previously discussed. Corridors such as those bordered by walls 67 and 68 and by walls 71 and 72 allow passengers to move from one to another of the previously discussed corridors A through F. Corridors are thus provided to allow passengers to walk from and to the terminal 23 and to walk between gates, as when transferring between flights, through distances which are relatively short as compared to those required in airports of conventional construction.

Figure 4:
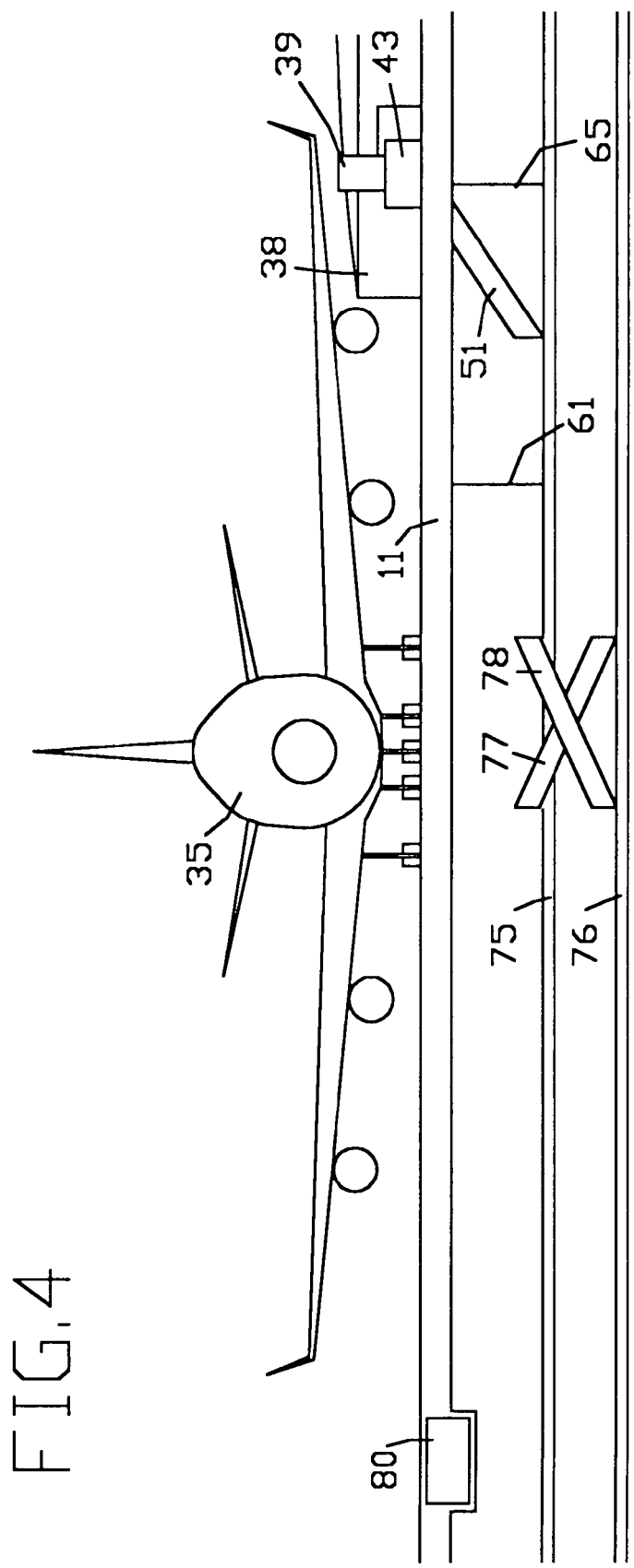
FIG. 4 is a sectional view taken substantially along line 4-4 of FIG. 2.

FIG. 4 shows that no interference is encountered with movement of the aircraft 35 to and from its loading/unloading position from either the dome structure 38 or from the ramp structures 39 and 40, when in inactive conditions, although such structures extend upwardly from the ground level.

FIGS. 4 and 5 provide cross-sectional drawings of the apron 11, of an underlying horizontal floor slab 75 which provides the floor of the passenger concourse and of a still lower floor slab 76 which provides the floor of corridors that underlie the corridors of the passenger concourse. Automated shuttles move on rails in such corridors to automatically carry passengers between gates and the terminal 23 and between gates and parking regions. Each shuttle may preferably have an "open top" construction. Access between corridors of the main passenger level and the underlying corridors may be provided by escalators such as escalators 77 and 78 as shown and by elevators, not shown, at appropriate locations. Alternatively, the shuttles may move on rails in the concourse level and bridges may be provided over intersecting corridors. In this case, the lower floor slab 76 may not be required.

FIGS. 4 and 5 also show a tunnel 80 in which conveyors can be provided to carry baggage to and from locations from which baggage can be moved by additional conveyors to baggage-receiving openings in an aircraft in the position of aircraft 35 and of other aircraft at positions in rows B, C and D aligned with the position of aircraft 35. Such additional conveyors may be pivotally moved from an inactive position out of the path of movement of aircraft and to an active position at which they are elevated, with movements similar to those described in connection with the passenger ramps 39-43. It is noted that while tunnel 80 in the arrangement illustrated in FIG. 1 will service only aircraft in the position of aircraft 35 and three others aligned therewith, other tunnels may service three pairs of aircraft. For example with reference to FIG. 1, a tunnel may be positioned to the right of aircraft 36 and midway between aircraft 36 and the aircraft immediately to its right.

It will be understood that modifications and variations may be effected without departing from the spirit and scope of the novel concepts of this invention.

The invention claimed is:

1. An airport comprising a ground level surface for support and horizontal movement of aircraft to and from runways, an underground surface below said ground level surface, said ground level surface including areas for loading and unloading of aircraft at parked positions, passenger gate areas on said underground surface and in underlying relation to said parked positions, and loading/unloading means for movement of passengers between said gate areas and to or from aircraft when in said parked positions, said loading/unloading means including first means for movement of passengers between a first level approximately that of said underground surface and landings at a second level approximately that of said ground level and second means for movement of passengers between said landings and a third level from and to which passengers can directly enter into and exit from aircraft, and upstanding structures that extend above said ground level surface and that overlie portions of said gate areas and of said landings to provide overhead protection for passengers when in said gate areas and when moving between said first level and said landings, wherein aircraft are movable longitudinally into said parked positions.

2. An airport as defined in claim 1, said second means including ramp structures having first ends adjacent said landings, and actuator means for control of said ramp structures between inactive conditions away from the path of movement of aircraft and active conditions in which opposite second ends of said ramp structures are at said third level and in adjacent relation to passenger-receiving openings of aircraft.

3. An airport as defined in claim 2 wherein said actuator means control the horizontal positioning of said opposite second ends and of the inclination of said ramp structures.

4. An airport as defined in claim 2, said actuator means being operative to effect pivotal movement of said ramp structures about vertical axes that are in adjacent relation to first ends and said landings.

5. An airport as defined in claim 1, wherein said first means include escalators and elevators.

6. An airport as defined in claim 1, wherein said upstanding structures include a top wall of light-transmitting material for use of ambient light in illuminating said gate areas.

7. An airport as defined in claim 6 wherein said top wall has a frusto-spherical shape.

8. An airport as defined in claim 1 wherein said loading/unloading means include a pair of loading/unloading means operative for simultaneous loading/unloading of an aircraft at fuselage openings that are fore and aft of a wing of the aircraft.

9. An airport as defined in claim 8 wherein said pair of loading/unloading means include a pair of ramp structures each having an active condition in which it extends in generally transverse relation to the fuselage of the aircraft from an end adjacent a fuselage opening to an opposite end spaced away from the fuselage, each of said pair of ramp structures having an inactive condition in which it is positioned out of the path of an aircraft being moved to and from a parked condition.

10. An airport as defined in claim 9, each of said pair of ramp structures being pivotal about a vertical axis adjacent said opposite end thereof and being positioned in generally parallel relation to the aircraft fuselage when in said inactive condition.

11. An airport comprising a ground level surface for support and horizontal movement of aircraft to and from runways, an underground surface below said ground level surface, passenger gate areas on said underground surface, said ground level surface including areas for support of aircraft at parked positions in overlying relation to said gate areas and including openings therein, and loading/unloading means for movement of passengers between said gate areas and to or from aircraft when in said parked positions, said loading/unloading means including first means for movement of passengers between a first level approximately that of said underground surface and landings at a second level approximately that of said ground level and second means for movement of passengers between said landings and a third level from and to which passengers can directly enter into and exit from aircraft, and upstanding structures that extend above said ground level surface and that overlie portions of said gate areas and of said landings to provide overhead protection for passengers when in said gate areas and when moving between said first level and said landings, wherein aircraft are movable longitudinally into said parked positions.

12. An airport as defined in claim 11, said parked positions being located in rows with aisles there-between for movement of aircraft to and from said parked positions.

13. An airport as defined in claim 11 including tunnels below said ground level surface for movement of baggage to and from aircraft in said parked positions.

14. An airport as defined in claim 13, said parked positions being located in rows with aisles there-between for movement of aircraft to and from said parked positions, and said tunnels extending in transverse relation to said rows with each tunnel being usable for servicing aircraft at parked positions in a plurality of said rows.

15. An airport as defined in claim 11 wherein substantially all passengers are loaded and unloaded through said openings in said ground level surface.

* * * * *